US009532302B2

(12) United States Patent
Ghaboosi et al.

(10) Patent No.: US 9,532,302 B2
(45) Date of Patent: Dec. 27, 2016

(54) COMMUNICATION NETWORK HAVING PROXIMITY SERVICE DISCOVERY AND DEVICE SELF-ORGANIZATION

(71) Applicant: Broadcom Corporation, Irvine, CA (US)

(72) Inventors: Kaveh Ghaboosi, San Diego, CA (US); Manish Vemulapalli, San Diego, CA (US); Noel James Oates, La Jolla, CA (US); Yuqiang Tang, Plano, TX (US)

(73) Assignee: Broadcom Corporation, Irvine, CA (US)

( * ) Notice: Subject to any disclaimer, the term of this patent is extended or adjusted under 35 U.S.C. 154(b) by 130 days.

(21) Appl. No.: 14/213,826

(22) Filed: Mar. 14, 2014

(65) Prior Publication Data

US 2014/0286193 A1    Sep. 25, 2014

Related U.S. Application Data

(60) Provisional application No. 61/803,677, filed on Mar. 20, 2013.

(51) Int. Cl.
| | |
|---|---|
| H04W 4/00 | (2009.01) |
| H04W 48/14 | (2009.01) |
| H04W 12/06 | (2009.01) |
| H04W 64/00 | (2009.01) |
| H04W 8/18 | (2009.01) |
| H04W 4/20 | (2009.01) |
| H04W 84/18 | (2009.01) |
| H04W 8/00 | (2009.01) |
| H04W 92/18 | (2009.01) |

(52) U.S. Cl.
CPC ............. *H04W 48/14* (2013.01); *H04W 4/206* (2013.01); *H04W 8/186* (2013.01); *H04W 12/06* (2013.01); *H04W 64/00* (2013.01); *H04W 8/005* (2013.01); *H04W 84/18* (2013.01); *H04W 92/18* (2013.01)

(58) Field of Classification Search
CPC ...... H04W 48/14; H04W 84/18; H04W 64/00; H04W 12/06
USPC ................................................. 370/252, 254
See application file for complete search history.

(56) References Cited

U.S. PATENT DOCUMENTS

| | | | |
|---|---|---|---|
| 6,542,749 B2 * | 4/2003 | Tanaka ................ | H04W 76/002 455/41.2 |
| 2002/0032717 A1 * | 3/2002 | Malan ................. | H04L 12/2602 718/105 |
| 2003/0235175 A1 * | 12/2003 | Naghian ................. | H04L 12/66 370/338 |

(Continued)

*Primary Examiner* — Farah Faroul
(74) *Attorney, Agent, or Firm* — Sterne, Kessler, Goldstein & Fox PLLC

(57) ABSTRACT

Methods and systems for establishing and/or maintaining communication cluster environments that support a plurality of communication devices. The plurality of communication devices can be configured to communicate with one another utilizing the communication cluster environment. The communication within the communication cluster environment can include device-to-device communications between two or more of the plurality of communication devices. Further, the device-to-device communications can utilizes one or more non-3GPP wireless communication protocols and/or standards.

20 Claims, 9 Drawing Sheets

(56) References Cited

U.S. PATENT DOCUMENTS

| | | | |
|---|---|---|---|
| 2004/0068573 A1* | 4/2004 | Corbeil | H04L 63/08 709/229 |
| 2004/0122910 A1* | 6/2004 | Douglass | G06F 17/30902 709/214 |
| 2009/0019493 A1* | 1/2009 | Li | H04N 7/17336 725/49 |
| 2010/0223098 A1* | 9/2010 | Hjelm | G06Q 30/0204 705/7.33 |
| 2010/0331146 A1* | 12/2010 | Kil | G06Q 30/02 482/8 |
| 2011/0125850 A1* | 5/2011 | Rahnama | G06Q 10/10 709/205 |
| 2013/0111031 A1* | 5/2013 | Hoffmann | G06F 9/505 709/226 |
| 2014/0025673 A1* | 1/2014 | Sinha | G06Q 10/101 707/732 |
| 2014/0108562 A1* | 4/2014 | Panzer | G06Q 10/10 709/206 |
| 2014/0115098 A1* | 4/2014 | Reich | H04N 21/4334 709/217 |
| 2014/0207787 A1* | 7/2014 | Vohra | G06F 17/30321 707/741 |
| 2015/0081767 A1* | 3/2015 | Evens | H04L 67/30 709/203 |

* cited by examiner

COMMUNICATION NETWORK HAVING PROXIMITY SERVICE DISCOVERY AND DEVICE SELF-ORGANIZATION

CROSS REFERENCE TO RELATED APPLICATIONS

This patent application claims the benefit of U.S. Provisional Patent Application No. 61/803,677, filed Mar. 20, 2013, entitled "Method And Apparatus For Proximity Service Discovery And Device Self-Organization In LTE Networks Based On Internet Protocol Multimedia Subsystem (IMS)," which is incorporated herein by reference in its entirety.

BACKGROUND

Field

This application relates generally to wireless communications, including proximity service (ProSe) discovery of User Equipment (UE) and the self-organization of UEs within a communication environment.

BRIEF DESCRIPTION OF THE DRAWINGS/FIGURES

The accompanying drawings, which are incorporated herein and form a part of the specification, illustrate the embodiments of the present disclosure and, together with the description, farther serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specification and International Mobile Telecomunnications-2000 (IMT-2000) standard, each of which are incorporated by reference in their entirety. Further, although exemplary embodiments are described with reference to LTE, the more generic terms "mobile device" and "base station" are used herein except where otherwise noted to refer to the LTE terms "User Equipment (UE)" and "eNodeB/eNB," respectively.

As will be apparent to one of ordinary skill in the relevant art(s) based on the teachings herein, exemplary embodiments are not limited to the LTE standard, and can be applied to other cellular communication standards, including (bat not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) WLAN (IEEE 802.11), Bluetooth (IEEE 802.15.1 and Bluetooth Special Interest Group (SIG)), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

Figure 1:
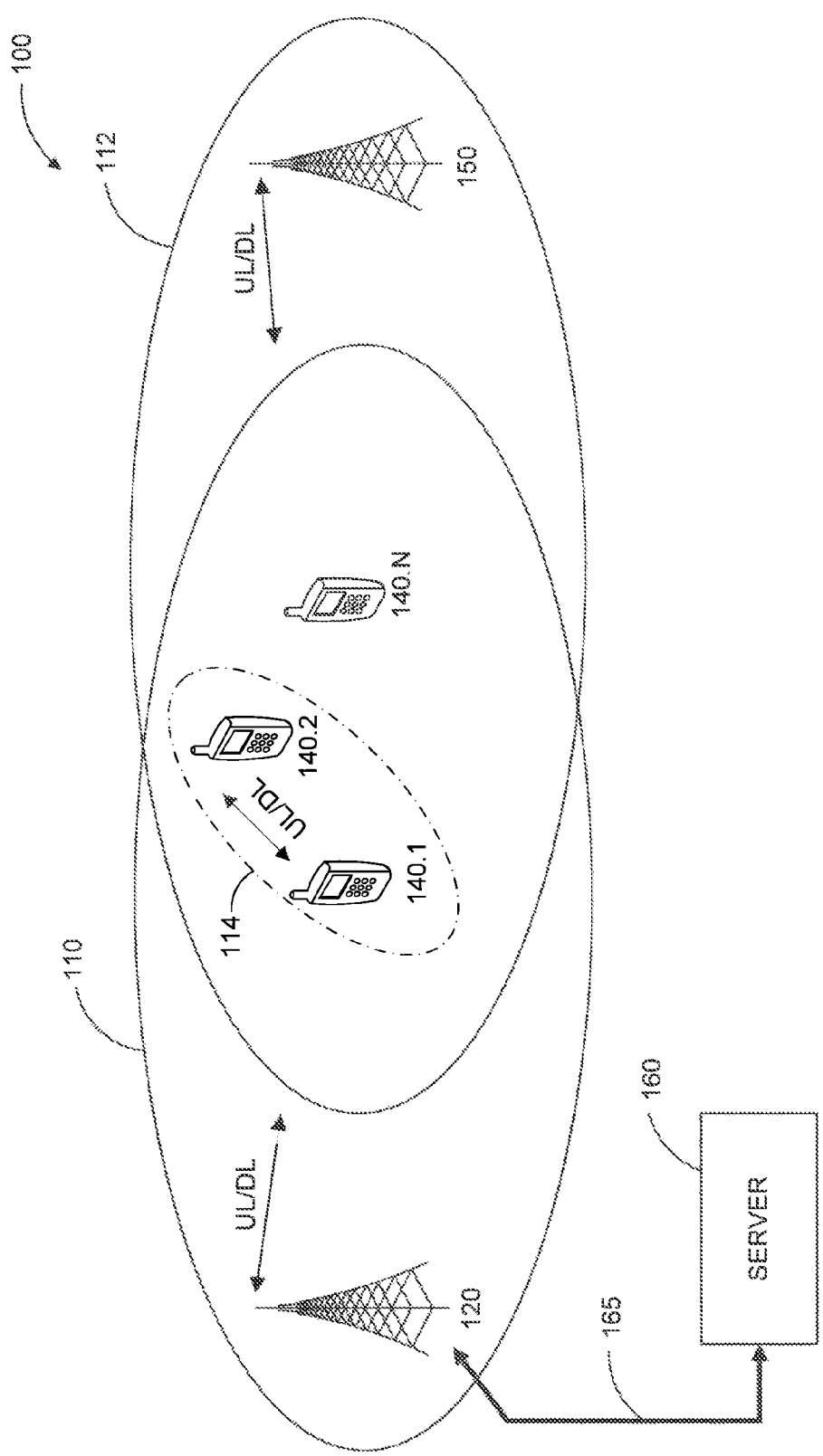
FIG. 1 illustrates an example network environment.

FIG. 1 illustrates an example communication environment 100 that includes a base station 120, one or more mobile devices 140.1 to 140.N, an access point (AP) 150, and a server 160. The base station 120, mobile devices 140, and AP 150 each include one or more processors, and/or suitable logic, circuitry, and/or code that is configured to communicate via one or more wireless technologies. The one or more processors can include (and be configured to access) one or more internal and/or external memories that store instructions and/or code that, when executed by the processor(s), cause the processor(s) to perform one or more operations to facilitate communications via one or more wireless technologies as discussed herein. Further, one or more of the mobile devices 140 can be configured to support co-existing wireless communications. The server 160 includes one or more processors, and/or suitable logic, circuitry, and/or code that is configured to process and/or maintain one or more clusterization profiles used in establishing and/or maintaining one or more corresponding cluster communication environments (referred hereinafter as "cluster(s)") of one or more mobile devices 140. In exemplary embodiments, the server 160 is a standalone system separate from the base station 120 and the AP 150, and/or is implemented within the base station 120, the AP 150, or a combination of both.

As discussed in more detail below, the establishment of a cluster can be utilized for proximity service (ProSe) discovery by one or more mobile devices 140 and/or the self-organization of the mobile device(s) 140. ProSe discovery refers to the processes and/or mechanisms implemented by a mobile device 140 to discover one or more other mobile devices 140 within the proximity of the mobile device 140, and to identify one or more services provided by the other mobile device(s) 140 that may be utilized by the mobile device 140. The self-organization of mobile device(s) 140 refers to the formation of one or more clusters by one or more mobile devices 140 to facilitate the exchange of information between the mobile devices participating in a particular cluster. A cluster is communication environment that includes one or more mobile devices 140 that are identified in the corresponding clusterization profile and that are configured to exchange information between the mobile device(s) participating in the cluster. Accordingly, the cluster can be exclusive to the "members" identified in the clusterization profile. The cluster can be formed within one or more existing communication environments and/or can be formed outside of one or more communication environments. The mobile devices 140 participating in the cluster can be configured to exchange information using one or more 3GPP and/or non-3GPP protocols. Further, when the cluster is formed within an existing communication environment, the one or more 3GPP and/or non-3GPP protocols utilized by the mobile devices 140 participating in the cluster can be different from the protocol(s) of the existing communication environment. The mobile device(s) 140 of the cluster may exchange information using one or more device-to-device communications that bypass one or more base stations and/or access points of the existing communication environment or any other communication environment.

In exemplary embodiments, one or more of the clusterization profiles includes one or more characteristics of a cluster, including a status of the cluster (e.g., active or inactive), a location of the cluster (which may include one or more previous locations where the cluster was previously active), a time-to-live of the cluster that identifies a length of time the cluster is to remain active, security information associated with the cluster that identifies the cluster as a public or private cluster, one or more members of the cluster, one or more services associated with the cluster, and/or one or more other attributes of the cluster as will be apparent to those skilled in the relevant arts. The services associated with the cluster can include one or more services provided by the cluster and/or by one or more of the members of the cluster, and/or one or more services requested by the cluster and/or by one or more of the members of the cluster. In exemplary embodiments, the services include, for example, one or more commercial applications, one or more social networking applications, one or more network information applications, one or more inter-system and/or device-to-device offloading applications, one or more public safety applications, one or more voice communication applications (e.g., exchanging of information related to voice data and/or the establishment of one or more voice calls), one or more multimedia communication applications (e.g., exchanging of information related to multimedia data (e.g., pictures, videos, text data)), and/or one or more other applications and/or information as would be apparent to those of ordinary skill in the relevant arts.

In these examples, a commercial application can include, for example, the ability to offer, and/or the desire for, the exchange of commercial sales and/or discount information, including the exchanging of coupons, discount codes, or the like. A social networking application can include, for example, the ability to offer, and/or the desire for, the exchange of social networking information, including, for example, the exchange of calendar and/or event information, contact information, location information, and/or any other information that may be exchanged with one or more social networking systems. A network information application can include, for example, the ability to offer, and/or the desire for, information regarding the status of one or more networks, the health of the network(s), the quality of service offered by the network(s), the date rates supported by network(s), current, recent, and/or average date rates of the network(s), security protocols of the network(s), the number of active devices on the network(s) (which may include information about one or more of the active devices), or the like. The network information can be information associated with the wireless network provided by the base station 120 and/or AP 150, and/or information associated with the backbone network supporting the base station 120 and/or AP 150. A public safety application can include, for example, the ability to offer, and/or the desire for, the exchange of public safety information, emergency services information, police services information, fire services information, governmental information (including government announcements), weather information (including weather event information), natural disaster information, or any other information regarding the heath and/or safety of the public.

In these examples, an inter-system and/or device-to-device offloading application can include, for example, the ability to offer, and/or the desire for, the offloading of 3GPP and/or non-3GPP communications to one or more other 3GPP and/or non-3GPP networks, and/or the offloading of 3GPP and/or non-3GPP communications via a base station and/or access point to one or more device-to-device networks established between two or more mobile devices 140, including devices 140 that are operating in a cluster. Further, the inter-system and/or device-to-device offloading application can include one or more 3GPP and/or non-3GPP communication protocols that are to be used for the inter-system and/or device-to-device offloading, and/or one or more instructions for participating device(s) in the offloading of communications that instruct such devices to enable and/or disable one or more communication protocols. In these examples, the information and/or instructions can be set forth in the clusterization profile. For example, if the clusterization profile defines that device-to-device offloading (i.e., device-to-device communications) is to utilize, for example, the Bluetooth protocol, the clusterization profile can include instructions for the participating device(s) within the device-to-device communication environment to enable Bluetooth communications (e.g., to turn on its Bluetooth transceiver) and to facilitate a connection with one or more mobile devices 140. By implementing the ability to enable and/or disable of one or more communication protocols (and their corresponding radios), the device-to-device offloading operations can provide a power saving feature that provides member devices the ability to have one or more radios in a disabled (or low-power state) until needed for device-to-device communications.

The server 160 may include one or more processors, and/or suitable logic, circuitry, and/or code that is configured to process and/or maintain one or more clusterization profiles, and one or more well-known memory devices that may store the clusterization profile(s), code, instructions, and/or other data that may be accessed by the one or more processors and/or circuits. The server 160 can be configured to communicate with the base station 120 and/or AP 150 via a communication channel 165 utilizing one or more well-known wired technologies (e.g., via a core (backhaul) network) and/or one or more well-known wireless technologies, including the various wireless protocols and/or standards discussed herein. FIG. 1 shows the server 160 connected to the base station 120 via the communication channel 165. However, it will be understood by those skilled in the relevant art(s) that the server 160 can be connected to the AP 150 and/or one or more other base stations and/or access points in addition to, or in alternative to, the base station 120. Further, the server 160 may be implemented within the base station 120 and/or the AP 150, and/or within one or more other base stations and/or APs.

One or more of the mobile devices 140 can include, for example, one or more transceivers having one or more processors, and/or suitable logic, circuitry, and/or code that is configured to transmit and/or receive wireless communications via one or more wireless technologies within the communication environment 100. The base station 120 and AP 150 each include one or more processors, and/or suitable logic, circuitry, and/or code that is configured to: (1) receive one or more wired communications via one or more well-known wired technologies (e.g., within a core (backhaul) network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include, for example, one or more wireless protocols discussed above.

As described in more detail below, one or more mobile devices 140 can be configured to establish one or more clusters with one or more other communication devices 140 to establish device-to-device communications between the mobile devices 140 participating in the cluster(s). The device-to-device communications between two or more mobile devices 140 can be established to offload communications from one or more 3GPP access networks and/or one or more non-3GPP access networks associated with the base station 120 and/or AP 150 to one or more other 3GPP access networks and/or one or more other non-3GPP access networks established between the mobile devices 140. For example, communications between a first mobile device 140.1 and a second mobile device 140.2 via a Long-Term Evolution (LTE) access network supported by the base station 120 can be offloaded to a device-to-device communication environment established between the mobile devices 140 utilizing, for example, a wireless local access network (WLAN), Bluetooth, NFC, or the like without relying on the LTE access network supported by the base station 120. In this example, communications will be exchanged directly between the mobile devices 140 instead of routing the communications over the LTE access network. That is, in an embodiment, the device-to-device communications bypass any base stations and/or access points within the communication environment 100.

Similarly, the one or more mobile devices 140 can be configured to offload communications from a 3GPP and/or non-3GPP access network to another 3GPP and/or non-3GPP access network. For example, a mobile device 140 can be configured to offload wireless communications within a Long-Term Evolution (LTE) access network supported by base station 120 to a wireless local access network (WLAN) (e.g., a WLAN wireless access point) supported by the AP 150. Further, although the offloading of communications is described from the perspective of offloading communication from the base station 120 to the AP 150, it will be understood by those skilled in the relevant art(s) that the offloading is not limited to this perspective and that communications can be offloaded from the AP 150 to the base station 120.

The mobile devices 140 can be configured to communicate with the base station 120 in a serving cell or sector 110 of the communication environment 100, with the access point (AP) 150 in a wireless local access network (WLAN) 112, and/or with one or more other mobile devices 140 located within the cluster 114 via one or more device-to-device connections. For example, the mobile devices 140 receive signals on one or more downlink (DL) channels from the base station 120, AP 150, and/or one or more other mobile devices 140, and transmit signals to the base station 120, AP 150, and/or one or more other mobile devices 140 on one or more respective uplink (UL) channels.

In an exemplary embodiment, the base station 120 includes one or more processors, and/or suitable logic, circuitry, and/or code that is configured for communications conforming to 3GPP's LTE specification (e.g., the base station is an LTE base station), the AP 150 includes one or more processors, and/or suitable logic, circuitry, and/or code that is configured for communications conforming to IEEE's 802.11 WLAN specification (e.g., the AP 150 is a WLAN access point), and mobile devices 140 include one or more processors, and/or suitable logic, circuitry, and/or code that is configured for communications conforming to 3GPP's LTE specification and IEEE's 802.11 WLAN specification. The one or more processors, and/or suitable logic, circuitry, and/or code of the mobile device(s) 140 can be further configured for communications conforming to one or more other 3GPP and/or non-3GPP protocols via one or more device-to-device communication networks with one or more other mobile devices 140 within the cluster 114. That is, the mobile devices 140 can be configured to wirelessly communicate with the base station 120 utilizing 3GPP's LTE specification, with the AP 150 utilizing IEEE's 802.11 WLAN specification, and/or with one or more other mobile device 140 utilizing 3GPP's LTE specification, IEEE's 802.11 WLAN specification, and/or one or more other 3GPP and/or non-3GPP protocols. In this example, the serving cell or sector 110 is an LTE serving cell or sector and the WLAN 112 is a WLAN utilizing the 802.11 WLAN specification. In an exemplary embodiment, the communication of the mobile device 140 with one or more other mobile devices 140 can be a device-to-device communication that bypasses the base station 120 and/or the AP 150.

Those skilled in the relevant art(s) will understand that the base station 120, the AP 150, and the mobile devices 140 are not limited to these exemplary 3GPP and non-3GPP wireless protocols, and the base station 120, the AP 150, and/or the mobile devices 140 can be configured for wireless communications conforming to one or more other 3GPP and/or non-3GPP wireless protocols in addition to, or in the alternative to, the wireless protocols discussed herein.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile device 140 may be a stationary device, including, for example, a stationary computing device—such as a personal computer (PC), a desktop computer, a computerized kiosk, and an automotive/aeronautical maritime in-dash computer terminal.

Figure 2:
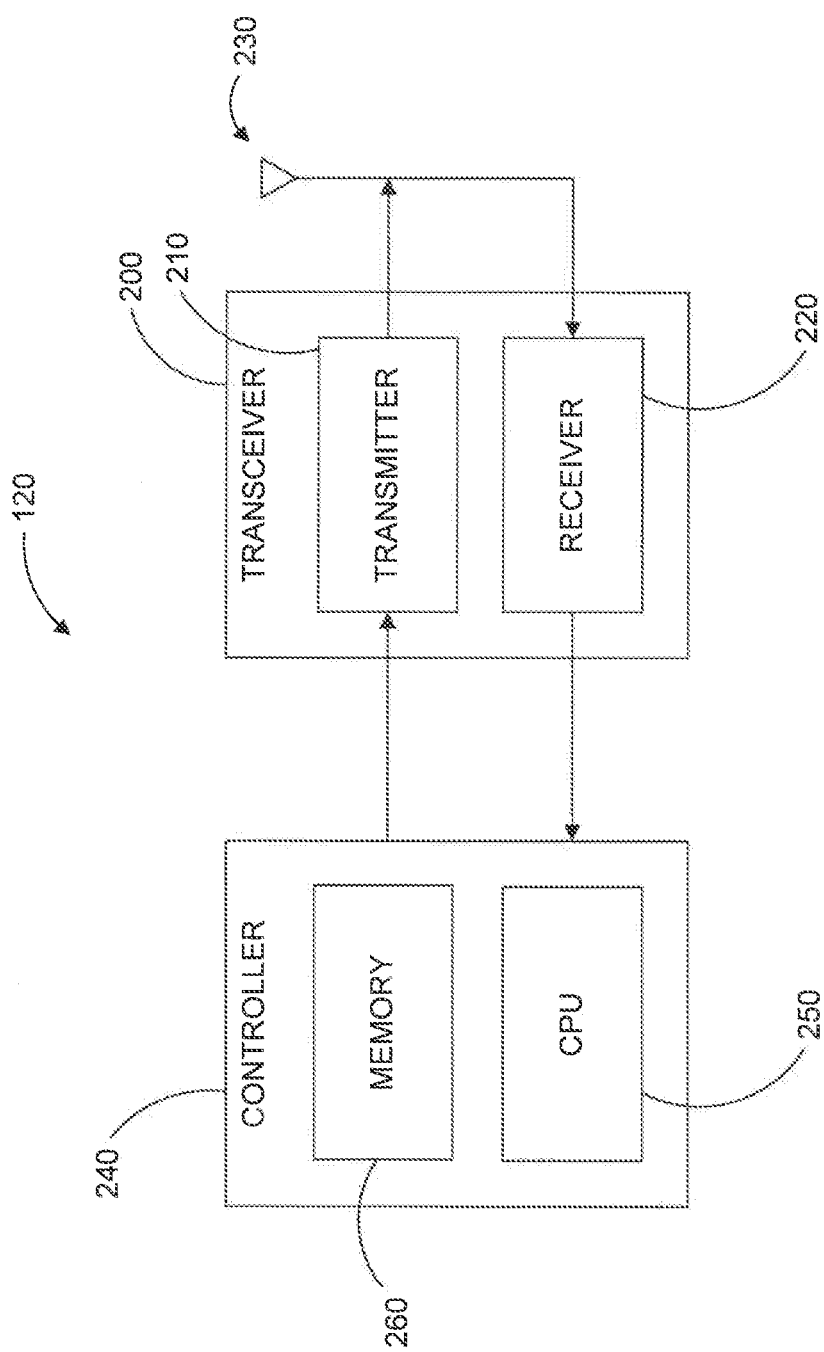
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 communicatively coupled to a controller 240.

The transceiver 200 includes one or more processors, and/or suitable logic, circuitry, and/or code that is configured to transmit and/or receive wireless communications via one or more wireless technologies within the communication environment 100. In particular, the transceiver 200 can include a transmitter 210 and a receiver 220 that have suitable logic, circuitry, and/or code configured to transmit and receive wireless communications, respectively, via one or more antennas 230. Those skilled in the relevant art(s) will recognize that the transceiver 200 can also include (but are not limited to) a digital signal processer (DSP), modulator and/or demodulator, a digital-to-analog converter (DAC) and/or an analog-to-digital converter (ADC), and/or a frequency converter to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The controller 240 includes one or more processors, and/or suitable logic, circuitry, and/or code that is configured to control the overall operation of the base station 120, including the operation of the transceiver 200. The controller 240 can include one or more processors (CPUs) 250 configured to carry out instructions to perform arithmetical, logical, and/or input/output (I/O) operations of the base station 120 and/or one or more components of the base station 120.

The controller 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both. In an exemplary embodiment, the memory 260 may store one or more clusterization profiles used in establishing and/or maintaining one or more corresponding clusters of mobile devices 140. The controller 240 can be further configured to interface with the server 160 via one or more well-known wired (e.g., via a core (backhaul) network) and/or one or more well-known wireless technologies (using the transceiver 200) to exchange one or more clusterization profiles.

Figure 3:
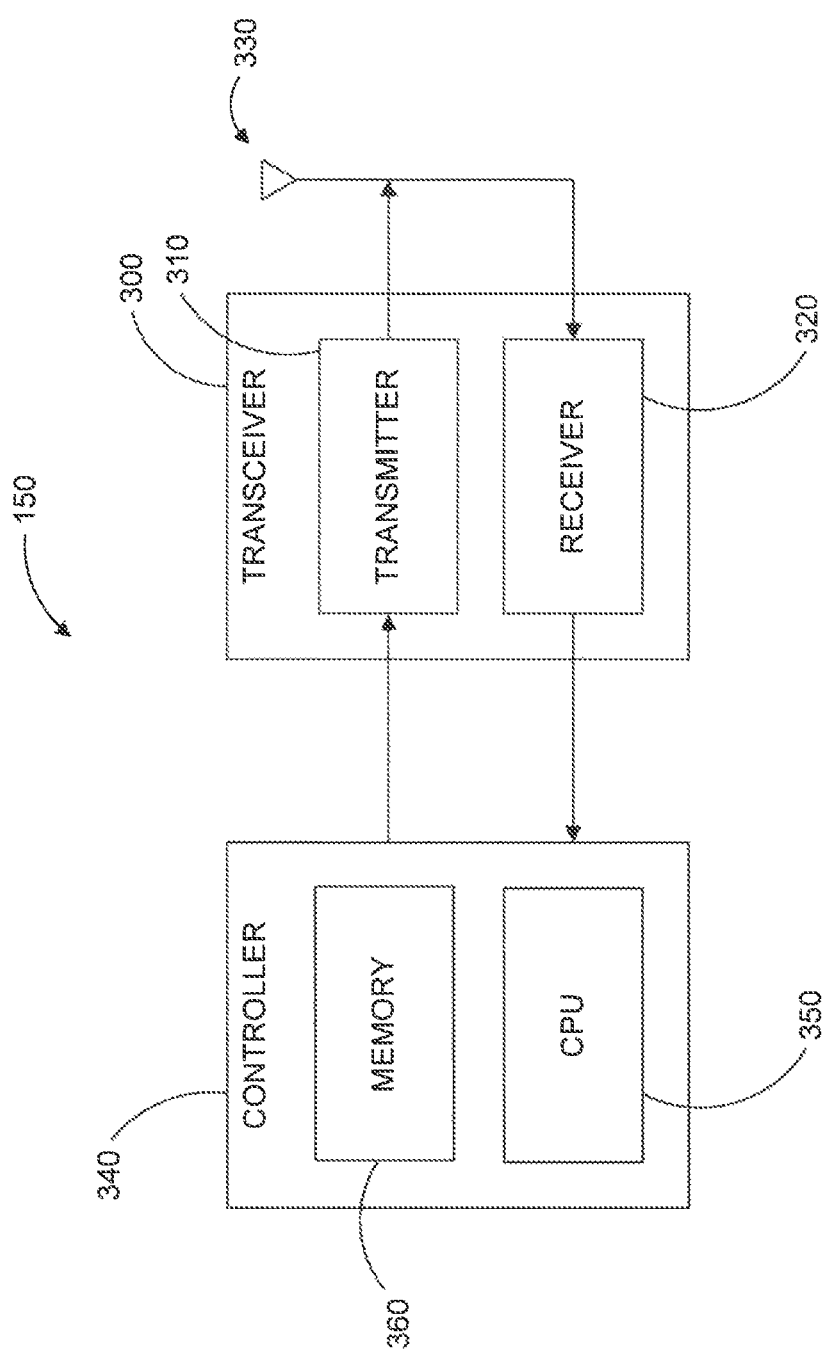
FIG. 3 illustrates an access point according to an exemplary embodiment of the present disclosure.

FIG. 3 illustrates the access point (AP) 150 according to an exemplary embodiment of the present disclosure. For example, the AP 150 can include a transceiver 300 communicatively coupled to a controller 340.

The transceiver 300 is similar to the transceiver 200 and includes one or more processors, and/or suitable logic, circuitry, and/or code that is configured to transmit and/or receive wireless communications via one or more wireless technologies within the communication environment 100. In particular, the transceiver 300 can similarly include a transmitter 310 and a receiver 320 that have one or more processors, and/or suitable logic, circuitry, and/or code configured to transmit and receive wireless communications, respectively, via one or more antennas 330. Those skilled in the relevant art(s) will recognize that the antenna 330 may include an integer array of antennas, and that the antenna 330 may be capable of both transmitting and receiving wireless communication signals. For example, the AP 150 can be configured for wireless communication utilizing a Multiple-input Multiple-output (MIMO) configuration.

In an exemplary embodiment, the transceiver 300 is configured for wireless communications conforming to one or more non-3GPP protocols. For example, the transceiver 300 is configured for wireless communications conforming to IEEE's 802.11 WLAN specification. In this example, the transceiver 300 can be referred to as WLAN transceiver 300. Those skilled in the relevant art(s) will understand that the transceiver 300 is not limited to communication conforming to IEEE's 802.11 WLAN specification, and can be configured for communications that conform to one or more other non-3GPP protocols and/or one or more 3GPP protocols. It should be appreciated that the transceiver 300 can be referred to by one or more other 3GPP and/or non-3GPP protocols in embodiments where the transceiver 300 is configured for such other communications conforming to the other non-3GPP and/or 3GPP protocols.

The controller 340 is similar to the controller 240 and includes one or more processors, and/or suitable logic, circuitry, and/or code that is configured to control the overall operation of the AP 150, including the operation of the transceiver 300. The controller 340 can include one or more processors (CPUs) 350 configured to carry out instructions to perform arithmetical, logical, and/or input/output (I/O) operations of the AP 150 and/or one or more components of the AP 150. The controller 340 can further include a memory 360 that stores data and/or instructions, where when the instructions are executed by the processor(s) 350, perform the functions described herein. The memory 360 can be any well-known volatile and/or non-volatile memory similar to the memory 260 described above. Similarly, the memory 360 can be non-removable, removable, or a combination of both. In an exemplary embodiment, the memory 360 may store one or more clusterization profiles used in establishing and/or maintaining one or more corresponding clusters of mobile devices 140. The controller 340 can be further configured to interface with the server 160 via one or more well-known wired (e.g. via a core (backhaul) network)

and/or one or more well-known wireless technologies (using the transceiver 300) to exchange one or more clusterization profiles.

Figure 4:
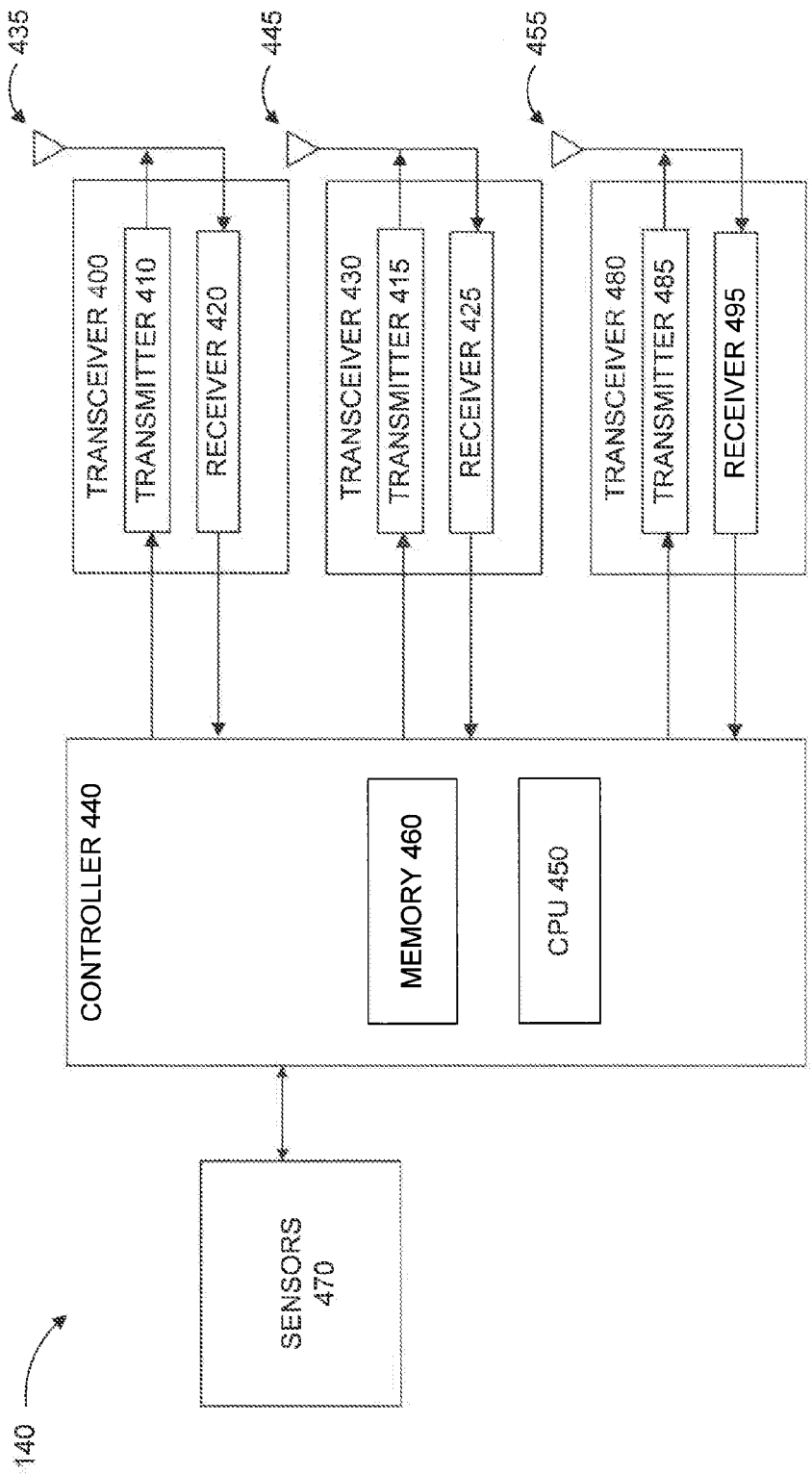
FIG. 4 illustrates a mobile device according to an exemplary embodiment of the present disclosure.

FIG. 4 illustrates the mobile device 140 according to an exemplary embodiment of the present disclosure. The mobile device 140 can include a controller 440 communicatively coupled to an LTE transceiver 400, a WLAN transceiver 430, and a Bluetooth transceiver 480. The mobile device 140 can be configured for wireless communications conforming to one or more wireless protocols defined by 3GPP and/or one or more non-3GPP wireless protocols. In an exemplary embodiment, the mobile device 140 is configured for wireless communication conforming to 3GPP's LTE specification, for wireless communication conforming to IEEE's 802.11 WLAN specification, and for wireless communication conforming to the Bluetooth protocol. Those skilled in the relevant art(s) will understand that the mobile device 140 is not limited to these exemplary 3GPP and non-3GPP wireless protocols, and the mobile device 140 can be configured for wireless communications conforming to one or more other 3GPP and/or non-3GPP wireless protocols in addition to, or in the alternative to, the wireless protocols discussed herein, and/or to a subset of the LTE, WLAN and Bluetooth specifications/protocols discussed above.

The LTE transceiver 400 includes one or more processors, and/or suitable logic, circuitry, and/or code that is configured for transmitting and/or receiving wireless communications conforming to 3GPP's LTE specification. In particular, the LTE transceiver 400 can include an LTE transmitter 410 and an LTE receiver 420 that have suitable logic, circuitry, and/or code configured for transmitting and receiving wireless communications conforming to 3GPP's LTE specification, respectively, via one or more antennas 435. Transceiver 400 need not be limited to LTE, and could operate according to one or more other 3GPP and/or non-3GPP protocols, as will be understood by those skilled in art.

The WLAN transceiver 430 includes one or more processors, and/or suitable logic, circuitry, and/or code that is configured for transmitting and/or receiving wireless communications conforming to IEEE's 802.11 WLAN specification. In particular, the WLAN transceiver 430 can include a WLAN transmitter 415 and a WLAN receiver 425 that have suitable logic, circuitry, and/or code configured for transmitting and receiving wireless communications conforming to IEEE's 802.11 WLAN specification, respectively, via one or more antennas 445. Transceiver 430 need not be limited to WLAN, and could operate according to one or more other 3GPP and/or non-3GPP protocols, as will be understood by those skilled in art.

The Bluetooth transceiver 480 includes one or more processors, and/or suitable logic, circuitry, and/or code that is configured for transmitting and/or receiving wireless communications conforming to the Bluetooth protocol as defined by the Bluetooth Special Interest Group (SIG) and/or standardized in IEEE's 802.15.1 specification. In particular, the Bluetooth transceiver 480 can include a Bluetooth transmitter 485 and a Bluetooth receiver 495 that have suitable logic, circuitry, and/or code configured for transmitting and receiving wireless communications conforming to Bluetooth protocol, respectively, via one or more antennas 455. Transceiver 480 need not be limited to Bluetooth, and could operate according to one or more other 3GPP and/or non-3GPP protocols, as will be understood by those skilled in art.

Regarding the LTE transceiver 400, the WLAN transceiver 430, and the Bluetooth transceiver 480, the LTE transceiver 400, the WLAN transceiver 430, and/or the Bluetooth transceiver 480 can also include (but are not limited to) a digital signal processer (DSP), modulator and/or demodulator, a digital-to-analog converter (DAC) and/or an analog-to-digital converter (ADC), and/or a frequency converter to provide some examples. Further, those skilled in the relevant art(s) will recognize that antennas 435, 445 and/or 455 may include an integer array of antennas, and that the antennas may be capable of both transmitting and receiving wireless communication signals. It will also be understood by those skilled in the relevant art(s) that any combination of the LTE transceiver 400, WLAN transceiver 430, and Bluetooth transceiver 480, as well as one or more other transceivers, circuits, and/or processors may be embodied in a single chip and/or die.

The controller 440 includes one or more processors, and/or suitable logic, circuitry, and/or code that is configured to control the overall operation of the mobile device 140, including the operation of the LTE transceiver 400, WLAN transceiver 430 and Bluetooth transceiver 480. The controller 440 can include one or more processors (CPUs) 450 configured to carry out instructions to perform arithmetical, logical, and/or input/output (I/O) operations of the mobile device 140 and/or one or more components of the mobile device 140. The controller 440 can further include a memory 460 that stores data and/or instructions, where when the instructions are executed by the processor(s) 450, perform the functions described herein. Similarly, the memory 460 can be any well-known volatile and/or non-volatile memory, and can be non-removable, removable, or a combination of both. The controller 440 can be further configured to interface with the server 160 via one or more well-known wireless technologies (using the transceivers 400, 430, and/or 480) to exchange one or more clusterization profiles.

In an exemplary embodiment, the controller 440 is configured to create one or more clusterization profiles that define one or more clusters that may be formed (activated) by the mobile device 140. The clusterization profiles may be stored in memory 460, and accessed and executed by the CPU 450 to effectuate the formation of the cluster defined in the corresponding clusterization profile.

The controller 440 can be further configured to communicate the clusterization profile to the server 160 via the base station 120 (or one or more other base stations and/or access points in communication with the server 160). The communication of the clusterization profile to the server 160 can be referred to as the registration of the clusterization profile. Further, the controller 440 can be configured to activate the cluster (i.e., form the cluster) by notifying the server 160 that the mobile device 140 would like to establish a cluster defined by the clusterization profile. The activation request can include the location where the cluster is to be formed (e.g., the current location of the mobile device), the time-to-live of the cluster, and/or an update to the cluster status (e.g., that the status of the cluster is "established"). The activation request can also include, for example, an update to the allowed members of the cluster, services associated with the cluster and/or the mobile device 140, and/or whether the cluster is a private or public cluster.

The controller 440 can be further configured to generate and maintain one or more subscriber profiles that associate the mobile device 140 with one or more clusterization profiles and their corresponding clusters. The subscriber profiles can be stored in memory 406, and accessed and executed by the CPU 450 to effectuate the joining of one or more clusters. For example, to join a private cluster, the mobile device's subscriber profile contains appropriate credentials (that are defined in the clusterization profile for the cluster) that grant the mobile device 140 access to the private cluster. An exemplary subscriber profile is described below in more detail with respect to FIG. 6.

In an exemplary embodiment, the clusterization profile(s) may be created by a service provider, a network administrator, an employer, and/or any other device and/or entity besides the mobile device(s) 140 as would be understood by those skilled in the relevant art(s). In this example, the mobile device(s) 140 may receive a previously created clusterization profile from the server 160 that has been provided to the server 160 by, for example, a network administrator, and/or may receive the previously created clusterization profile from the other device/entity (e.g., network administrator) without utilizing the server 160. The received clusterization profile may then be activated by the mobile device(s) 140.

In an exemplary embodiment, the mobile device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, one or more of the mobile devices 140 can include one or more positional and/or movement sensors 470 (e.g., GPS, accelerometer, gyroscope sensor, etc.) implemented in (and/or in communication with) the mobile device(s) 140. Here, the location and/or movement of the mobile device 140 can be determined using one or more transceivers configured for navigation purposes, one or more of the positional and/or movement sensors 470, and/or one or more positional determinations using signal characteristics relative to one or more base stations and/or access points.

In exemplary embodiments, the implementation of one or more clusterization profiles and the formation of one or more corresponding clusters can utilize the Internet Protocol (IP) Multimedia Subsystem (IMS) architectural framework as defined by 3GPP. 3GPP's IMS architectural framework protocol is incorporated herein by reference in its entirety. In utilizing the IMS architectural framework, the clusterization profile(s) are created and provided to a server (e.g., server 160). In these examples, the creation of the clusterization profile and the providing of created profile to, for example, the server 160 can be referred to as "registration" of the clusterization profile. Within the IMS architectural framework, the server 160 can be referred to as Clusterization Application Server (cAs) 160.

Figure 5A:
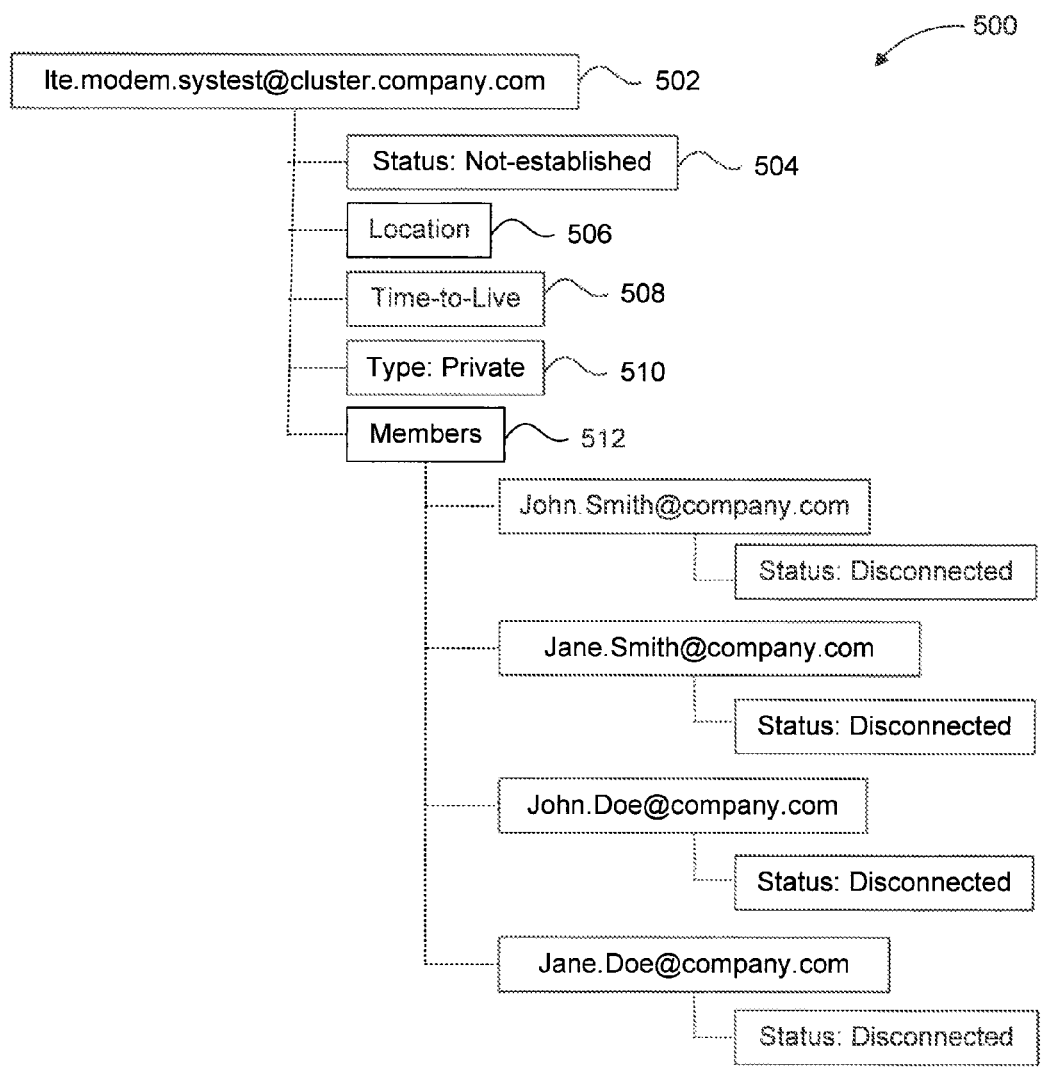
FIGS. 5A and 5B illustrate clusterization profiles according to exemplary embodiments of the present disclosure.

FIG. 5A illustrates an example clusterization profile 500 according to exemplary embodiments of the present disclosure. The clusterization profile 500 can be generated or implemented by one or more mobile devices 140, the base station 120, the AP 150, the server 160, and/or one or more other devices within communication environment 100 as described herein.

The clusterization profile 500 includes cluster identification information 502, cluster status information 504, cluster location information 506, time-to-live information 508, security information 510, one or more members 512 of the cluster, and one or more services associated with the cluster.

The clusterization profile 500 is not limited to these exemplary attributes, and the clusterization profile 500 can include one or more other attributes as will be apparent to those skilled in the relevant arts without departing from the spirit and scope of the present disclosure. In this example, the services can be defined within member information corresponding to one or more of the members 512.

The identification information 502 can be any information that uniquely identifies the cluster. In an exemplary embodiment, the identification information conforms to the Session Initiation Protocol (SIP) Uniform Resource Identifiers (URI) format. For example, the identification information 502 can identify the cluster as "lte.modem.systest@cluster.company.com." In this example, the "company" portion of the SIP URI can identify the company associated with the cluster.

The cluster status information 504 can identify the current status of the cluster associated with the clusterization profile 500. For example, because the cluster is not currently active, the status is "Not-established."

The location information 506 can include a prospective location in which the cluster is to be activated and/or one or more previous locations where the cluster was previously active. The location of the cluster can be provided by the activating mobile device 140 and correspond to the location of the mobile device 140 at the time of activation of the cluster. The location of the mobile device 140 can be determined using, for example, one or more of the positional and/or movement sensors 470, and/or one or more positional determinations using signal characteristics relative to one or more base stations and/or access points.

The time-to-live information 508 can include a time duration in which the cluster is to remain active, a time of day the cluster will be active, a date the cluster will be active, and/or any other temporal information as would be understood by those skilled in the relevant art(s). For example, the time-to-live information can identify to one or more other mobile devices 140 when the cluster will be active and for what duration it will remain active.

The security information 510 can define the accessibility of the cluster to one or mobile devices 140. For example, the security information 510 can indicate whether the cluster is a private cluster with limited access or if the cluster is a public cluster open to any mobile device 140 within range of the cluster. For private clusters, the access to the cluster can be limited to one or more members defined in the clusterization profile 500.

The member information 512 can identify one or more members associated with the cluster. Further, the member information 512 can also include the corresponding connection status of the member(s) (e.g., whether the particular member is connected or disconnected from the cluster) and/or one or more services associated with the member(s). In this example, the cluster is not active so the connection status of the members is "Disconnected."

Figure 5B:
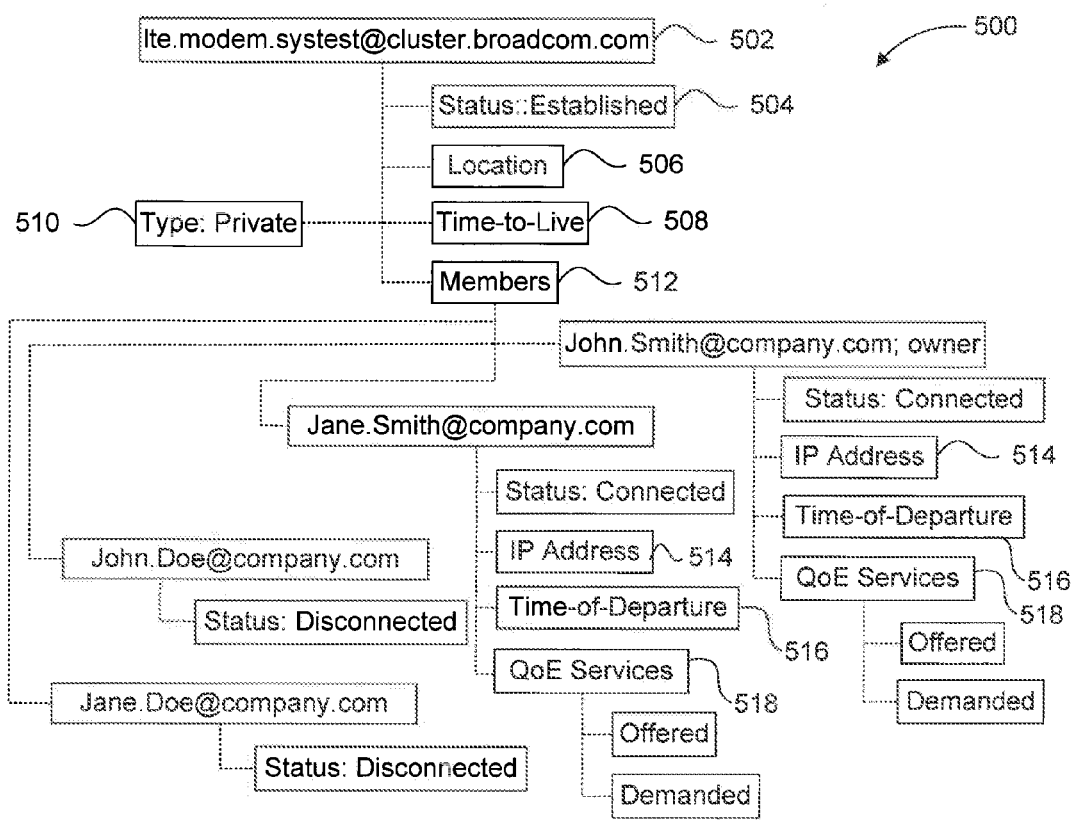

FIG. 5B illustrates the exemplary clusterization profile 500 in an active state. In this example, the status information 504 identifies the cluster as "Established." Further, two members identified in the member information 512 are connected to the cluster as evidenced by the "Connected" connection status associated with each of the connected members.

For connected members, the member information 512 can also include the location 514 of the corresponding member in the form of, for example, an IP address associated with the member, time-of-departure information 516, and Quality of Experience (QoE) services information 518.

The time-of-departure information 516 can include a time duration in which the member will stay connected to the cluster, a time of day the member will disconnect from the cluster, a date the member will disconnect, and/or any other temporal information as would be understood by those skilled in the relevant art(s). For example, the time-of-departure information 516 can identify to one or more other members when the member will disconnect from the cluster.

The QoE services information 518 can include one or more services offered by the corresponding member and/or one or more services requested by the corresponding member. For example, if the member will provide information to other connected members identifying the current status of, for example, the LTE access network, the QoE services information 518 for this member can include, for example, "network information" within the "offered" segment of the QoE services information 518.

Figure 6:
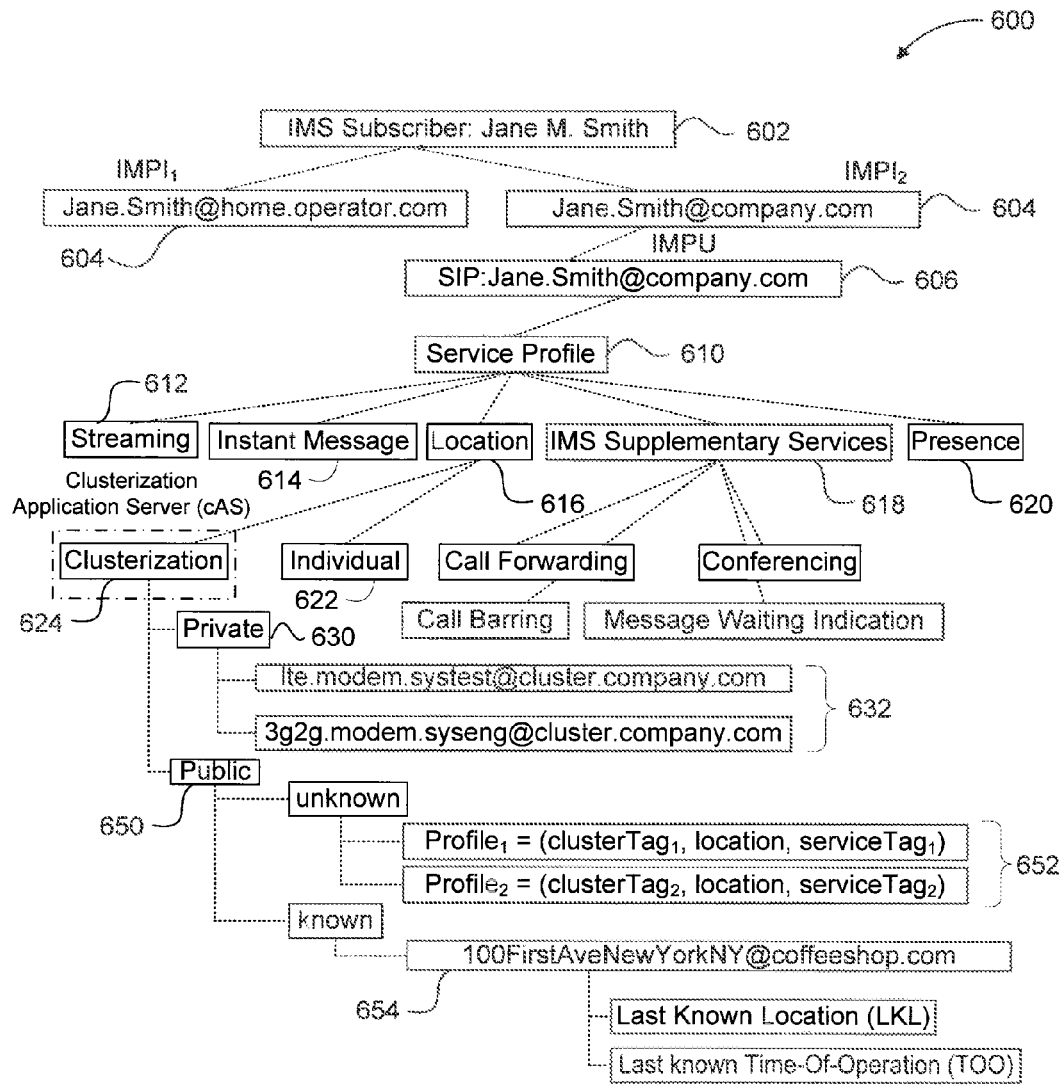
FIG. 6 illustrates a clusterization profile according to an exemplary embodiment of the present disclosure.

FIG. 6 illustrates an example clusterization profile 600 according to exemplary embodiments of the present disclosure. The clusterization profile 600 can be implemented by the server 160 (cAS 160) for the formation of clusters and is similar to the clusterization profiles 500.

The clusterization profile 600 includes subscriber identification information 602, and a service profile 610. The subscriber identification information 602 can include one or more IMS private identifiers (IMPI) 604 and one or more IMS public user identifiers (IMPU) 606. The service profile 610 can include one or more services, including, for example, streaming services 612, instant messaging services 614, location services 616, IMS supplementary services 618, presence services 620, and/or any other services that would be understood by those skilled in the relevant art(s). The IMS supplementary services 618 may include, for example, call forwarding services, call barring services, conferencing services, message waiting indication services, and/or any other services that would be understood by those skilled in the relevant art(s).

The location services 616 can further include individual location services 622 and clusterization location services 624. The individual location services 622 define the location and tracking information utilized for location and tracking services within the IMS architecture framework. The clusterization location services 624 define location and tracking information utilized for public and private cluster formations that are known to the corresponding mobile device 140. The clusterization location services 624 can include a private profile 630 that defines one or more private clusters in which the subscriber identified in the subscriber identification information 602 has appropriate credentials allowing access to the private cluster(s), and/or a public profile 650 that defines one or more public clusters 654 that are known to the subscriber and/or one or more public cluster categorizes 652 that identify possible services the subscriber would be interested in and/or the location of such services.

The private profile 630 can include, for example, cluster identification information 632 that is similar to the identification information 502, and can uniquely identify a cluster. In an exemplary embodiment, the identification information conforms to the Session Initiation Protocol (SIP) Uniform Resource Identifiers (URI) format. For example, the cluster identification information 632 can identify a first cluster as "lte.modem.systest@cluster.company.com" and a second cluster as "3g2g.modem.syseng@cluster.company.com." In an exemplary embodiment, the cluster identification information 632 can also include cluster status information (e.g., cluster status information 504), cluster location information (e.g., cluster location information 506), time-to-live information (e.g., time-to-live information 508), and/or one or more other cluster-related information as would be understood by those skilled in the relevant arts. In operation, the mobile device 140 can be configured to join and participate in a cluster if the cluster identification information 632 corresponds to the mobile device 140. This allows for private clusters to limit access to those mobile devices 140 that are associated with one or more clusterization profiles 600 having appropriate cluster identification information 632.

The public profile 650 can include more public clusters 654 that are known to the subscriber associated with the clusterization profile 600. These public clusters 654 can be one or more public clusters that the mobile device 140 has, for example, previously interacted with and/or discovered, been notified of by the service provider supporting the mobile device 140, been notified of by one or more other mobile devices 140, or the like. The public profile 650 can also include one or more public cluster categories 652 that define subscriber preferences for potential public clusters that are unknown to the mobile device 140 and the corresponding subscriber. For example, the public cluster categories 652 can define one or more services the mobile device 140 would be interested in utilizing if offered by potential public clusters, one or more locations in which such services are desired, and/or any other parameters as would be understood by those skilled in the relevant art(s). In operation, if the mobile device 140 encounters an available public cluster offering services and/or locations matching the parameters defined in the public cluster categories 652, the mobile device 140 can be configured join the public cluster to utilize the offered services.

Figure 7A:
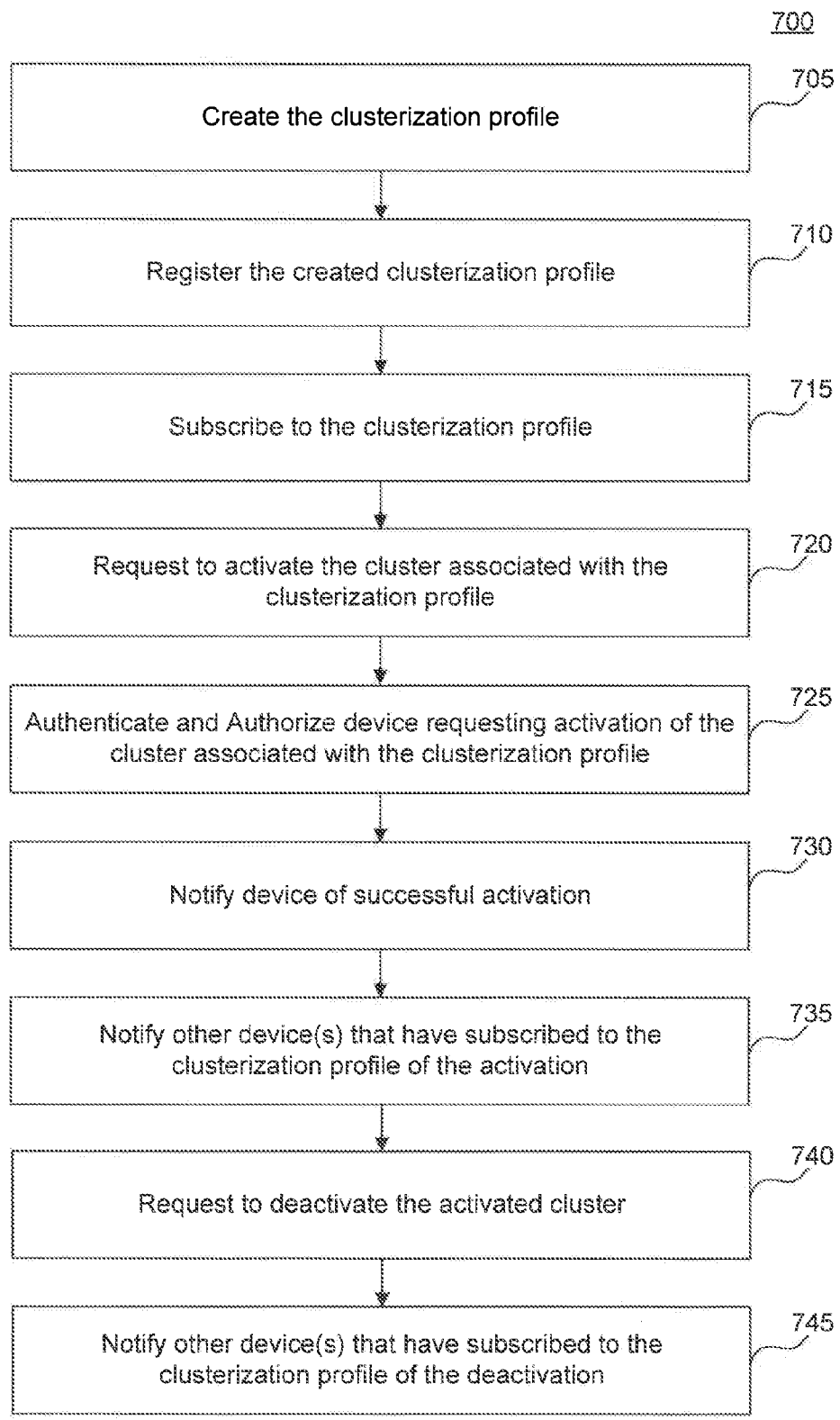
FIG. 7A illustrates a flowchart of a clusterization process according to an exemplary embodiment of the present disclosure.
Figure 7B:
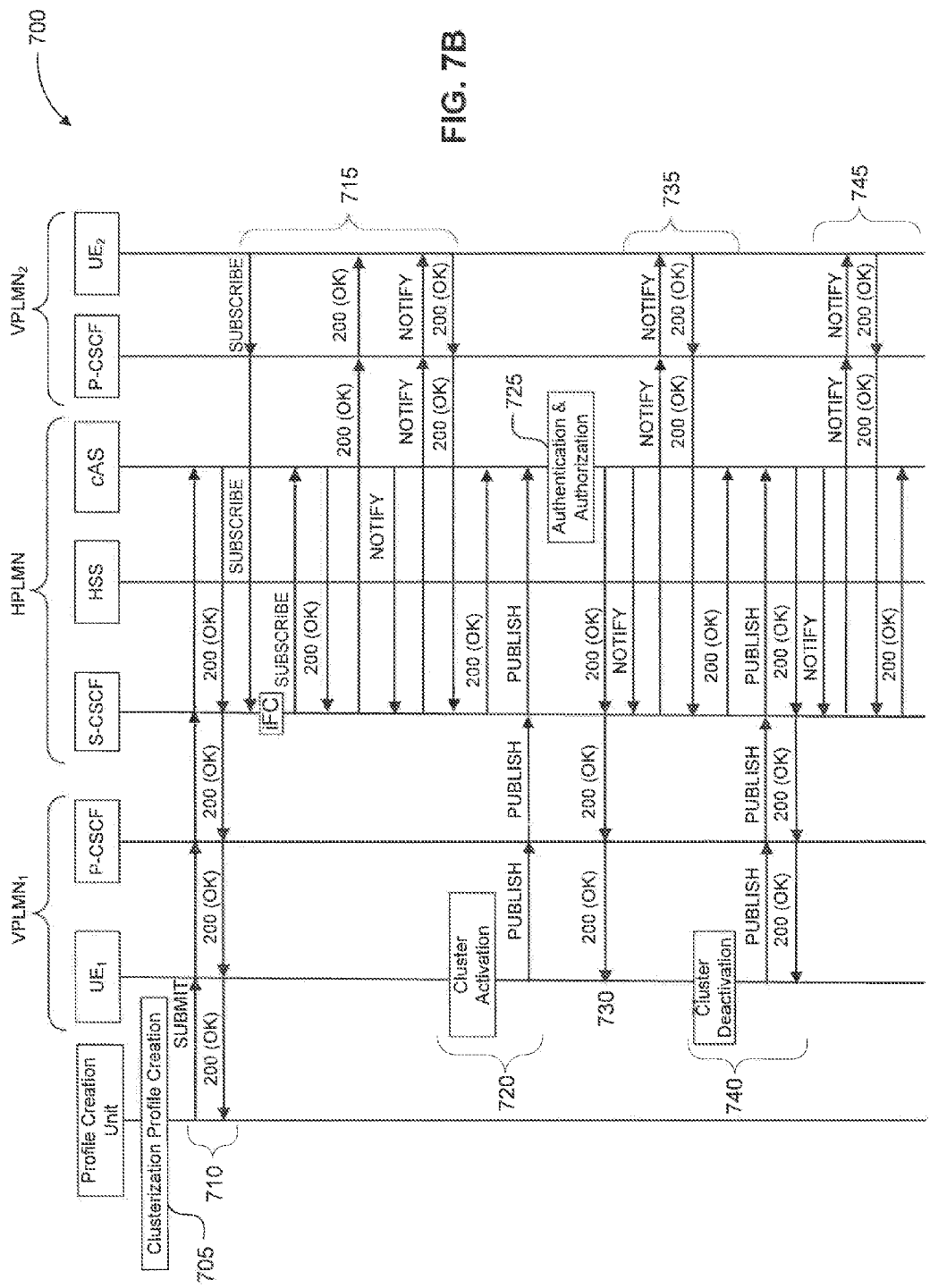
FIG. 7B illustrates a flowchart of a clusterization process according to an exemplary embodiment of the present disclosure.

An exemplary operation of proximity service (ProSe) discovery and the self-organization of mobile devices 140 are described below with reference to FIGS. 7A and 7B, which illustrate flowcharts 700 of clusterization processes in accordance with exemplary embodiments of the present disclosure. The methods of flowcharts 700 are described with continued reference to FIGS. 1-6. The steps of the method of flowchart 700 are not limited to the order described below, and the various steps may be performed in a different order. Further, two or more steps of the method of flowchart 700 may be performed simultaneously with each other.

The flowchart 700 illustrates various interactions between network entities of the IMS architectural framework, which include a Home subscriber server (HSS), a proxy call session control function (P-CSCF), a visited public land mobile network (VPLMN), servicing call session control function (S-CSCF), a home public land mobile network (HPLMN), and a clusterization application server (cAS), as well as the interaction with one or more mobile devices (e.g., $UE_1$, $UE_2$) and a Profile creation unit (PCU).

The method of flowchart 700 begins at step 705, where the clusterization profile is created. In an exemplary embodiment, one or more mobile devices 140 create the clusterization profile. In this example, the controller 440 of a mobile device 140.1 ($UE_1$) functions as the profile creation unit (PCU) and is configured to generate the clusterization profile. That is, the PCU is embodied within the mobile device 140.1 ($UE_1$). In an alternative embodiment, the clusterization profile is created by another device besides one of the mobile devices 140. For example, a network administrator, a service provider, or the like can be configured to generate the clusterization profile and provide the clusterization profile to the mobile device 140.1 ($UE_1$). In this example, the other device (e.g., network administrator)

functions as the PCU and is configured to generate the clusterization profile and provide the generated clusterization profile to the mobile device 140.1 ($UE_1$).

After the clusterization profile has been created (step 705), the flowchart 700 transitions to step 710, where the mobile device 140.1 ($UE_1$) submits the generated clusterization profile (SUBMIT) to the P-CSCF, which forwards the clusterization profile to the S-CSCF, which forwards the clusterization profile to the cAS (e.g., server 160). The cAS then acknowledges receipt of the clusterization profile by notifying the S-CSCF (200 (OK) command), which notifies the P-CSCF, which notifies the mobile device 140.1 ($UE_1$). In exemplary embodiments where the clusterization profile is created by a device other than the mobile device 140.1, the PCU is configured to generate the clusterization profile and submit the generated clusterization profile to the cAS, which forwards the clusterization profile on to the mobile device 140, or to submit the clusterization profile to the mobile device 140, which may then forward the clusterization profile to the cAS. The acknowledgement is similarly forwarded from the cAS to the PCU. The creation and submission of the clusterization profile to the cAS can be referred to as "registration" of the clusterization profile.

At step 715, a second mobile device 140.2 ($UE_2$) subscribes to the clusterization profile that was previously created and provided to the cAS (e.g., server 160). In an exemplary embodiment, mobile device 140.2 ($UE_2$) subscribes to the clusterization profile by generating and providing a subscription request (SUBSCRIBE command) to the cAS. For example, the mobile device 140.2 ($UE_2$) provides the subscription request to the S-CSCF of the HPLMN via the P-CSCF of the $VPLMN_2$. Upon receipt, the S-CSCF, using initial filter criteria (iFC), subscribes the mobile device 140.2 ($UE_2$) to the clusterization profile and notifies the cAS of the subscription. The cAS, through the S-CSCF and the P-CSCF, provides an acknowledgement to the mobile device 140.2 ($UE_2$) of the subscription. Once notified, the mobile device 140.2 ($UE_2$) will receive notifications from the cAS in response to one or more other mobile devices 140 (e.g., mobile device 140.1 ($UE_1$)) activating the clusterization profile. This subscription process allows for the mobile devices 140 to save power and more efficiently search for potential clusters because the mobile devices 140 can be configured to only search for the cluster when the mobile devices 140 have been notified that the cluster has been activated by another device. Further, the mobile devices 140 can limit the search of activated clusters based on the location of the cluster and the location of the mobile devices 140. For example, if the mobile device 140.2 is notified of a cluster being activated, it can begin searching for the cluster when the mobile device 140.2 determines that the location of the mobile device 140.2 is within a predetermined distance from the location of the activated cluster. The location of the activated cluster can be reported to the subscribed mobile devices 140 using a publication notification as discussed in more detail below. In this example, the searching for the cluster can include, for example, identifying one or more communications associated with one or more mobile devices participating in the cluster.

At step 720, the mobile device 140.1 ($UE_1$) activates the previously registered clusterization profile. In an exemplary embodiment, the mobile device 140.1 ($UE_1$) is configured to generate an activation request and to provide the activation request to the cAS (PUBLISH) via the P-CSCF and the S-CSCF. The activation request can include, for example, the identification information of the mobile device 140.1, location where the cluster is to be formed (e.g., the current location and/or future location of the mobile device), the time-to-live of the cluster, and/or an update to the cluster status (e.g., that the status of the cluster is active). The activation request can also include an update to the allowed members of the cluster, services associated with the cluster and/or the mobile device 140, and/or whether the cluster is a private or public cluster.

After receipt of the activation request (step 720), the cAS (e.g., server 160) can be configured to authenticate and authorize the requesting mobile device 140.1 at step 720. The authentication and authorization process (step 725), can include determining whether the requesting mobile device 140.1 is an authorized member of the cluster by, for example, determining if the member information defined in the clusterization profile corresponds to the subscriber of the mobile device 140.1.

After the authentication and authorization process (step 725), the cAS (server 160) can be configured to notify the activating mobile device 140.1 ($UE_1$) of the results of the authentication and authorization process at step 730. For example, at step 730, the cAS can be configured to notify the mobile device 140.1 ($UE_1$) that it has been successfully authorized by providing the notification (200 (OK)) to the mobile device 140.1 ($UE_1$).

The cAS can also be configured to notify one or more of the subscribed mobile devices 140 (e.g., mobile device 140.2 ($UE_2$) of the activation of the clusterization profile by the mobile device 140.1 ($UE_1$) at step 735. For example, the cAS can generate a notification (NOTIFY) and provide it to the mobile device 140.2 ($UE_2$) via the S-CSCF and the P-CSCF. The mobile device 140.2 ($UE_2$) can then be configured to acknowledge receipt of the notification by providing an acknowledgment (200 (OK)) to the cAS via the P-CSCF and the S-CSCF. The notification provided to the mobile device 140.2 ($UE_2$) can include the identification information of the mobile device 140.1, location where the cluster is to be formed (e.g., the current location reported by the mobile device 140.1), the time-to-live of the cluster, an update to the cluster status (e.g., that the status of the cluster is "established"), an update to the allowed members of the cluster, services associated with the cluster and/or the mobile device 140, and/or whether the cluster is a private or public cluster. That is, the cAS can forward the cluster related information received from the mobile device 140.1 ($UE_1$) during the activation process to the subscribed mobile device 140.2 ($UE_2$). The mobile device 140.2 ($UE_2$) can then use this information to determine when to search for the cluster and/or attempt to join to cluster.

In these examples, following receipt of the notification that a cluster has been activated (step 735) that corresponds to the subscribed clusterization profile, the mobile device 140.2 ($UE_2$) can monitor its location and compare the monitored location to the location of the activated cluster that was provided to the mobile device 140.2 ($UE_2$) by the activation request (step 720) from the mobile device 140.1 ($UE_1$). When the difference between the monitored location and the cluster location is less than a predetermined threshold value, the mobile device 140.2 ($UE_2$) can be configured to search for the activated cluster. The searching for the activated cluster can include enabling and/or disabling one or more radios, tuning radio frequencies as necessary when enabled (including scanning radio frequencies), and/or any other well-known communication process for identifying networks as would be understood by those skilled in the relevant arts. Upon discovery of the cluster, the mobile device 140.2 (UE2) can be configure exchange information with one or more mobile devices 140 (e.g., mobile device 140.1) participating in the cluster via a device-to-device communication network that utilizes one or more 3GPP and/or non-3GPP protocols specified in the clusterization profile associated with the cluster. The information exchanged can include information related to, for example, one or more commercial applications, one or more social networking applications, one or more network information applications, one or more inter-system and/or device-to-device offloading applications, one or more public safety applications, one or more voice communication applications (e.g., exchanging of information related to voice data and/or the establishment of one or more voice calls), one or more multimedia communication applications (e.g., exchanging of information related to multimedia data (e.g., pictures, videos, text data)), and/or one or more other applications and/or information as would be apparent to those of ordinary skill in the relevant arts. For example, the clusterization profile can define that members are configured to exchange social media information and/or voice data communications with each other via the Bluetooth protocol utilizing a device-to-device communication network. In this example, the participating mobile devices 140.1 and 140.2 can be configured to enable their respective Bluetooth radios to effectuate the exchange of the social media information (and/or one or more voice calls) via the Bluetooth protocol. This allows for the exchange of such information to be offloaded from, for example, the LTE access network. That is, in an embodiment, the device-to-device communications bypass any base stations or access points within the communication environment 100.

The mobile device 140.1 ($UE_1$) can also be configured to deactivate the cluster as shown in step 740. In step 740, the mobile device 140.1 ($UE_1$) notifies the cAS that the cluster is to be deactivated by providing the cAS with a deactivation request (PUBLISH) via the P-CSCF and the S-CSCF. The cAS can then acknowledge the request and notify the mobile device 140.1 ($UE_1$). The deactivation request can instruct the cAS to immediately deactivate the cluster or can include a designated time in which the cluster is to be deactivated.

The cAS can then, at step 745, notify one or more of the subscribed mobile devices (e.g., mobile device 140.2 ($UE_2$)) that the cluster is to be deactivated and the time in which such deactivation will occur. For example, the cAS can provide a notification to mobile device 140.2 ($UE_2$) of the deactivation (NOTIFY) via the S-CSCF and the P-CSCF. The mobile device 140.2 ($UE_2$) can then acknowledge receipt of the deactivation notification. Following receipt, the mobile device 140.2 ($UE_2$) can be configured to disable future searching of the cluster until another activation notification is received by the mobile device 140.2 ($UE_2$). The mobile device 140.2 ($UE_2$) can also be configured to enable and/or disable one or more radios in response to the deactivation notification.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefor, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

In embodiments having one or more components that include one or more processors, each of the one or more processors can include one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
a transceiver configured to communicate with a server having a clusterization profile; and
a controller coupled to the transceiver and configured to:
subscribe to a cluster defined in the clusterization profile;
receive an activation notification indicating that the cluster has been activated and a location of the cluster;
determine a location of the communication device;
compare the determined location to the cluster location; and
search for the activated cluster based on the comparison of the determined location and the cluster location.

2. The communication device of claim 1, wherein the controller is further configured to:
join the cluster based on a search result of the search.

3. The communication device of claim 2, wherein the controller is further configured to:
determine another communication device identified in the clusterization profile that has joined the cluster; and
control the transceiver to communicate with the other communication device.

4. The communication device of claim 3, wherein the controller is further configured to:
determine service information associated with the other communication device based on the clusterization profile; and
control the transceiver to provide information identified in the service information to the other communication device.

5. The communication device of claim 4, wherein the service information is related to: a commercial application, a social networking application, a network information application, an inter-system offloading application, a device-to-device offloading application, a public safety application, a voice communication application, or a multimedia communication application.

6. The communication device of claim 5, wherein the commercial application includes an ability to exchange commercial sales or discount information.

7. The communication device of claim 5, wherein the social networking application includes an ability to exchange calendar and/or event information, contact information, or location information.

8. The communication device of claim 5, wherein the network information application includes an ability to exchange information regarding a status of a network, a quality of service offered by the network, a date rate supported by the network, a security protocol utilized by the network, or a number of active devices on the network.

9. The communication device of claim 2, wherein the controller is further configured to:
receive a deactivation notification indicating that the subscribed cluster has been deactivated; and
leave the deactivated cluster based on the deactivation notification.

10. The communication device of claim 3, wherein the controller is further configured to:
determine service information associated with the other communication device based on the clusterization profile; and
request information identified in the service information from the other communication device.

11. The communication device of claim 1, wherein the controller is further configured to:
determine a difference between the determined location and the cluster location defined in the clusterization profile; and
search for the activated cluster if the difference between the determined location and the cluster location is less than a predetermined threshold value.

12. The communication device of claim 1, wherein the controller is further configured to:
receive an update notification indicating that the clusterization profile has been updated;
generate an update acknowledgement in response to the update notification; and
control the transceiver to communicate the update acknowledgement to the server.

13. The communication device of claim 1, wherein the controller is further configured to:
generate a subscription request for the clusterization profile; and
control the transceiver to communicate the subscription request to the server to subscribe to the clusterization profile.

14. The communication device of claim 1, wherein the clusterization profile includes:
a location of the cluster defined by the clusterization profile;
at least one member of the cluster; and
one or more services associated with the at least one member.

15. A communication method utilizing a cluster configured to support a plurality of communication devices, the method comprising:
receiving a clusterization profile corresponding to the cluster;
storing the clusterization profile in a memory of a server;
notifying a first communication device of the plurality of communication devices of the receipt of the clusterization profile;
receiving, from the first communication device, a subscription request to subscribe the first communication device to the cluster associated with the clusterization profile;
receiving a request to activate the cluster from a second communication device of the plurality of communication devices; and
notifying the first communication device of an activation of the cluster, the activation of the cluster being in response to the request.

16. The communication method of claim 15, wherein the receiving of the clusterization profile comprises:
receiving the clusterization profile from the second communication device of the plurality of communication devices.

17. The communication method of claim 15, further comprising:
receiving, from the second communication device, a deactivation request to deactivate the cluster; and
notifying the first communication device of a deactivation of the cluster, the deactivation of the cluster being in response to the deactivation request.

18. The communication method of claim 15, wherein the clusterization profile comprises:
a location of the cluster;

member information of the cluster that includes the first and the second communication devices;
first service information associated with the first communication device; and
second service information associated with the second communication device.

19. The communication method of claim 15, further comprising:
authenticating the request to activate the cluster based on the clusterization profile; and
activating the cluster based on a successful authentication of the activation request.

20. The communication method of claim 15, further comprising:
receiving an update request to update the clusterization profile;
updating the clusterization profile based on the update request; and
notifying the first communication device or the second communication device of the updating of the clusterization profile.

* * * * *